(12) United States Patent
Fukuda

(10) Patent No.: US 8,870,079 B2
(45) Date of Patent: Oct. 28, 2014

(54) IC CARD, PORTABLE ELECTRONIC DEVICE, IC CARD ISSUING APPARATUS, AND COMMAND EXECUTION METHOD

(75) Inventor: Aki Fukuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 13/414,958

(22) Filed: Mar. 8, 2012

(65) Prior Publication Data

US 2012/0234925 A1 Sep. 20, 2012

(30) Foreign Application Priority Data

Mar. 18, 2011 (JP) ................................. 2011-061668

(51) Int. Cl.
*G06K 19/06* (2006.01)
(52) U.S. Cl.
USPC .......................... 235/492; 235/380; 235/438
(58) Field of Classification Search
USPC .......................................... 235/438, 380, 492
See application file for complete search history.

(56) References Cited

U.S. PATENT DOCUMENTS

| | | | |
|---|---|---|---|
| 5,126,541 A * | 6/1992 | Shinagawa | 235/438 |
| 5,276,903 A | 1/1994 | Shinagawa | |
| 6,199,755 B1 * | 3/2001 | Matsumoto et al. | 235/380 |
| 7,308,433 B1 | 12/2007 | Tomizawa | |

FOREIGN PATENT DOCUMENTS

| | | |
|---|---|---|
| JP | 03-291786 A | 12/1991 |
| JP | 2002-049904 A | 2/2002 |
| JP | 2003-132315 A | 5/2003 |
| JP | 2007-206902 A | 8/2007 |

OTHER PUBLICATIONS

Extended European Search Report dated Jun. 29, 2012 in corresponding EP Patent Application No. 12158779.4.
Office action mailed Jan. 7, 2014 in the corresponding JP application No. 2011-061668 (and English translation).

* cited by examiner

*Primary Examiner* — Karl D Frech
(74) *Attorney, Agent, or Firm* — Posz Law Group, PLC

(57) ABSTRACT

According to one embodiment, an IC card includes a storage unit, a receiving unit, and an executing unit. The storage unit is configured to store a file, store definition information to control the file, store a program designated by the definition information, and store command execution information to execute command processing corresponding to a command. The receiving unit is configured to receive the command. The executing unit is configured to interpret the command, execute the program on the basis of the definition information, and execute the command processing on the basis of the command execution information.

9 Claims, 7 Drawing Sheets

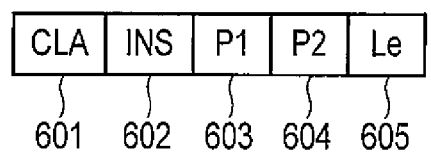
F I G. 6
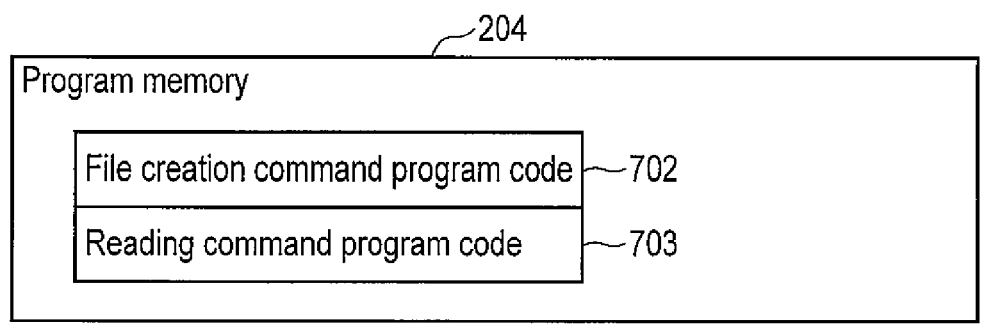
F I G. 7

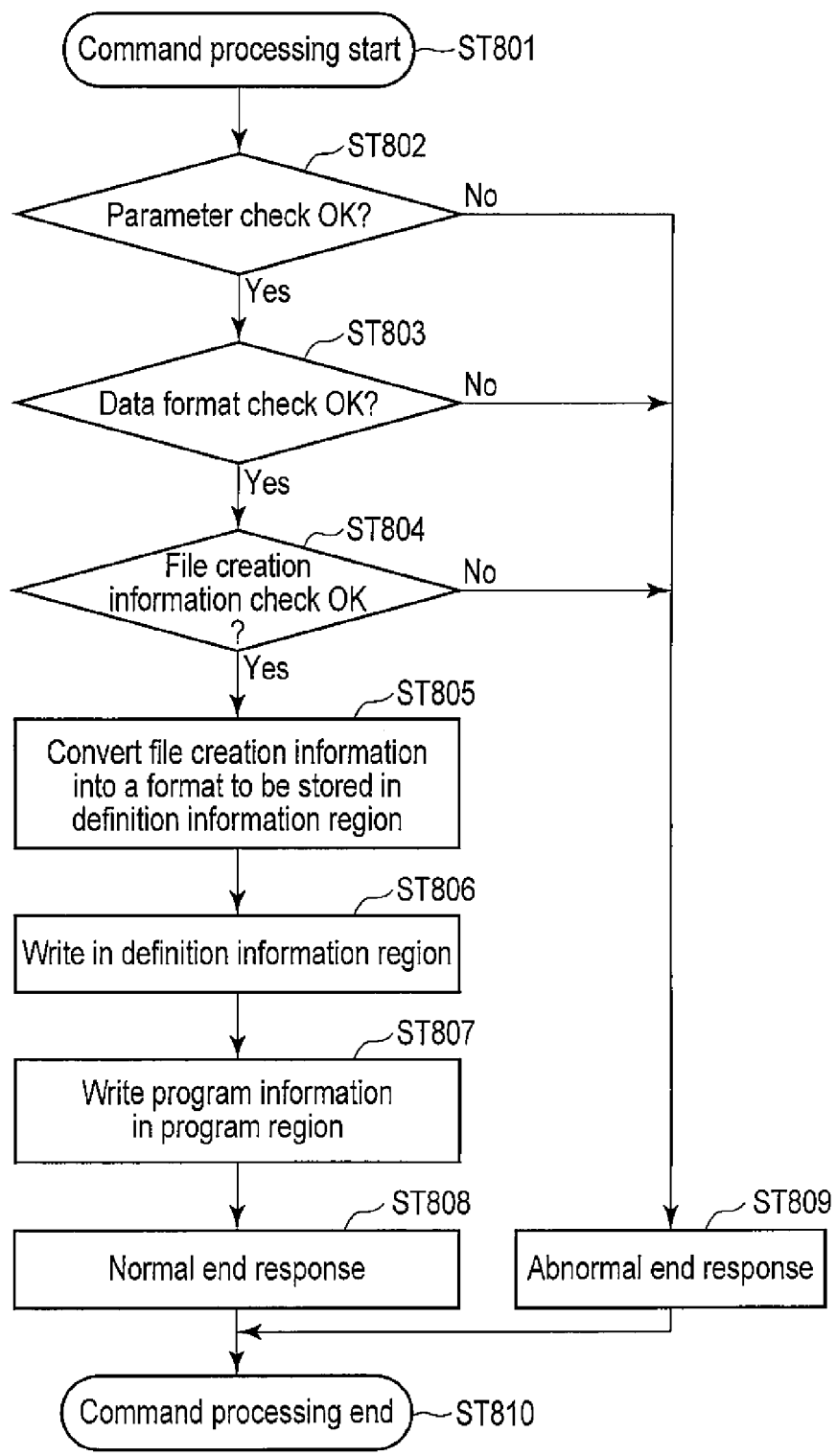
F I G. 8

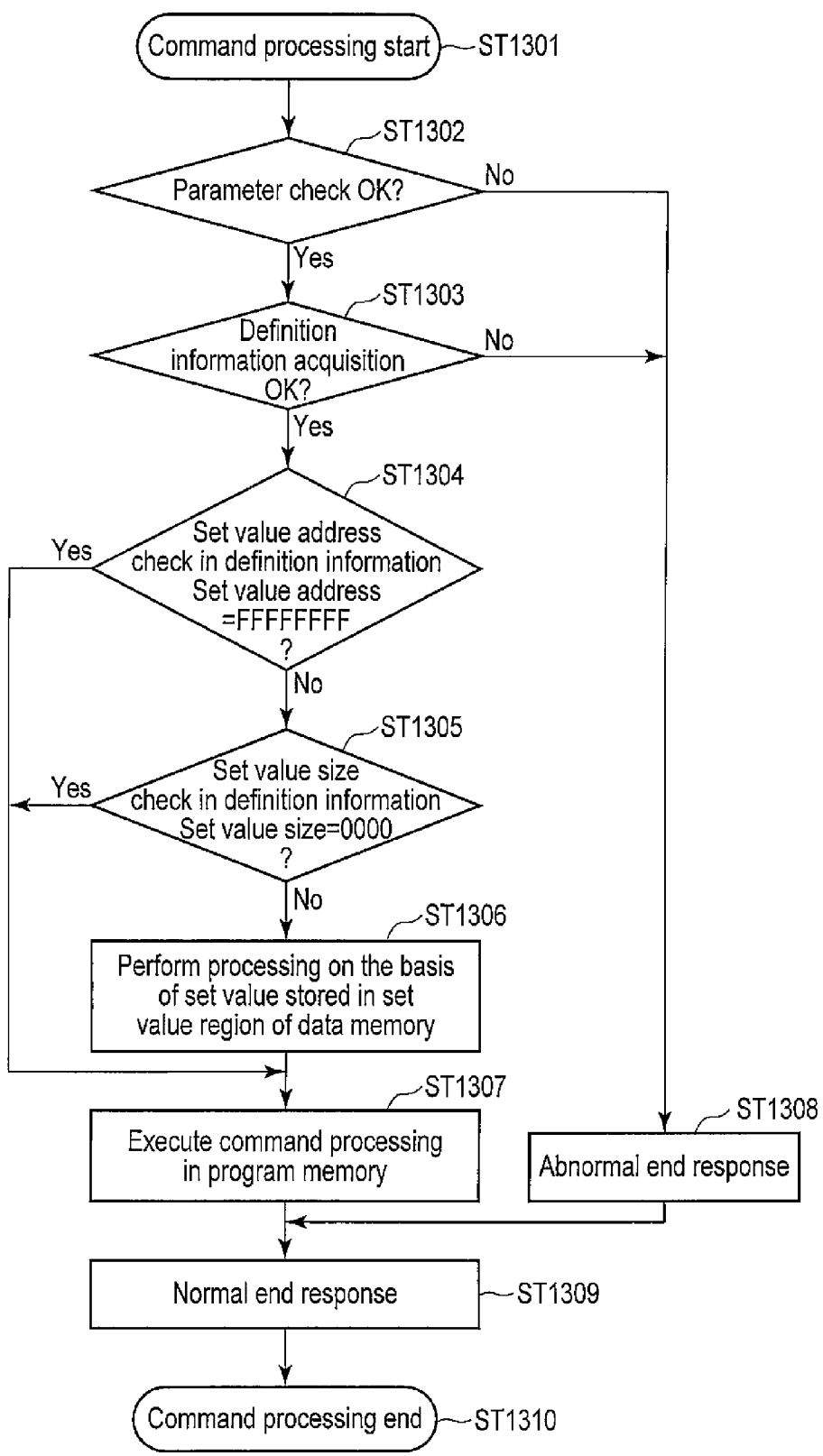
F I G. 13

US 8,870,079 B2

IC CARD, PORTABLE ELECTRONIC DEVICE, IC CARD ISSUING APPARATUS, AND COMMAND EXECUTION METHOD

CROSS-REFERENCE TO RELATED APPLICATIONS

This application is based upon and claims the benefit of priority from prior Japanese Patent Application No. 2011-061668, filed Mar. 18, 2011, the entire contents of which are incorporated herein by reference.

FIELD

Embodiments described herein relate generally to an IC card (a smartcard), a portable electronic device, an IC card (a smartcard) issuing apparatus, and a command execution method.

BACKGROUND

In recent years, portable electronic devices (communication media) referred to as IC cards have remarkably spread. For example, the IC cards are used not only for the settlements of credit cards, commuter passes, passports, driver licenses and the other transactions but also in various fields as ID cards such as staff member cards, club member cards and insurance cards.

The IC card contains therein an integrated circuit (IC) chip including a nonvolatile data memory in which data can be written and rewritten and a control element such as a CPU. Moreover, an IC card processing apparatus such as an IC card reader/writer transmits a read command to the IC card and reads data from the IC card, and transmits a write command to the IC card and writes data in the IC card.

The IC card is configured to support command processing to cope with a large number of presumed functions. The IC card processing apparatus transmits a command to the IC card, and the IC card receives the command, and selects command processing by option selection in accordance with a parameter of the command.

The IC card is configured as described above. Therefore, when wrong designation is performed on the basis of the command, the IC card executes wrong command processing as designated sometimes. Moreover, since the IC card is configured as described above, the card supports even an unnecessary function in a specific application, and hence processing load of the specific application becomes heavy sometimes.

BRIEF DESCRIPTION OF THE DRAWINGS

FIG. 6 is a diagram showing an example of a format of a reading command according to the embodiment;

FIG. 7 is a diagram showing an example of each program code stored in a program memory according to the embodiment;

FIG. 8 is a flowchart showing an example of command processing of the file creation command according to the embodiment;

FIG. 13 is a flowchart showing an example of the command processing of the reading command according to the embodiment.

DETAILED DESCRIPTION

In general, according to one embodiment, an IC card includes a storage unit, a receiving unit, and an executing unit. The storage unit is configured to store a file, store definition information to control the file, store a program designated by the definition information, and store command execution information to execute command processing corresponding to a command. The receiving unit is configured to receive the command. The executing unit is configured to interpret the command, execute the program on the basis of the definition information, and execute the command processing on the basis of the command execution information.

Figure 1:
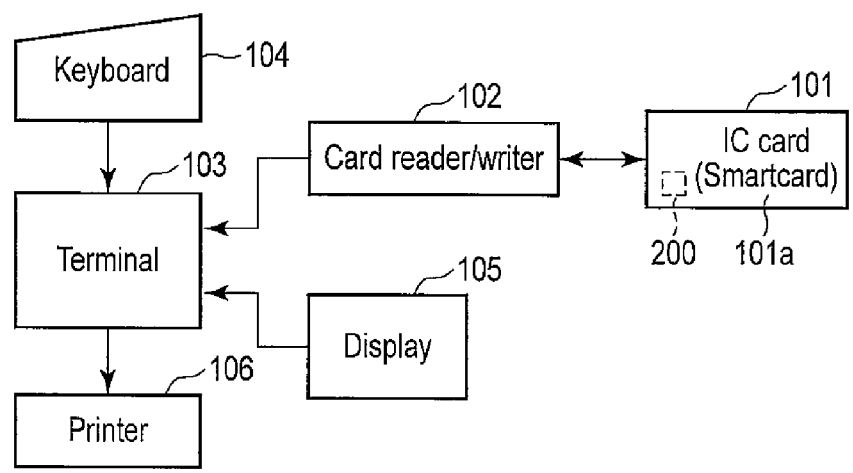
FIG. 1 is a diagram showing an example of a schematic constitution of an IC card system according to an embodiment.

FIG. 1 is a diagram showing an example of a schematic constitution of an IC card system (alias, a smart card system) according to an embodiment. As shown in FIG. 1, the IC card system includes an IC card (corresponding to a portable electronic device or a communication medium) 101, a card reader/writer 102, a terminal 103, a keyboard 104, a display 105, and a printer 106. The IC card 101 is configured to be connectable to the terminal 103 via the card reader/writer 102. The terminal 103 is connected to the keyboard 104, the display 105, and the printer 106. In consequence, the terminal 103 can communicate with the IC card 101 via the card reader/writer 102, and the terminal 103 (the card reader/writer 102) can transmit data to the IC card 101, and can receive data from the IC card 101.

Figure 2:
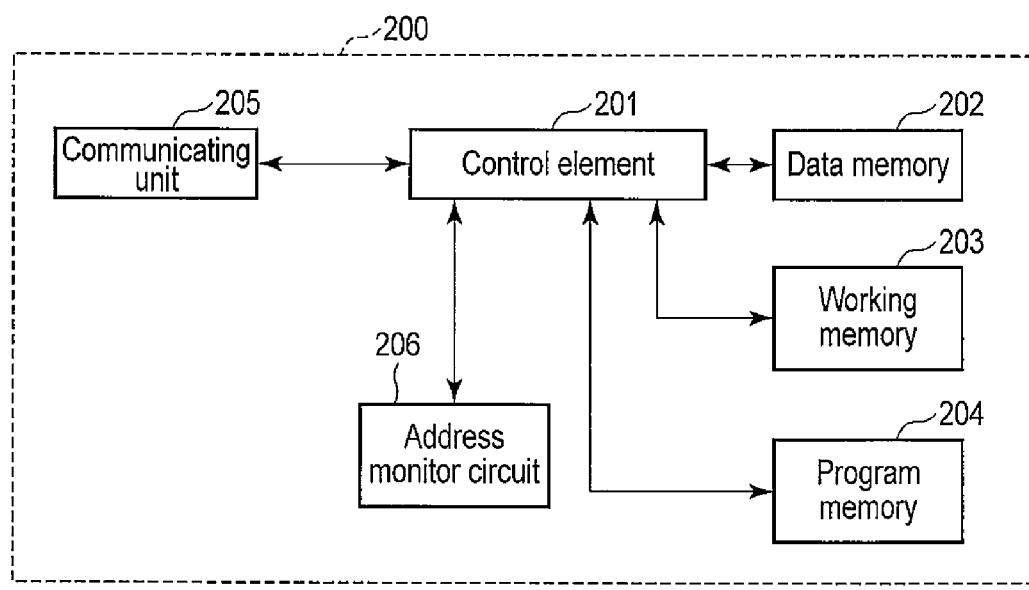
FIG. 2 is a diagram showing an example of a schematic constitution of an IC card according to the embodiment.

FIG. 2 is a diagram showing an example of a schematic constitution of the IC card 101 according to the embodiment. As shown in FIG. 2, the IC card 101 is constituted of a card main body (a base material) 101a of a plastic or the like, and includes one or more IC chips 200 (IC modules). For example, the one or more IC chips 200 are buried in the card main body of the IC card 101. The one or more IC chips 200 include a control element 201, a data memory (a nonvolatile memory) 202, a working memory 203, a program memory 204, a communicating unit 205, and an address monitor circuit 206.

The control element 201 is constituted of a control element such as a CPU, and functions as execution means for executing processing corresponding to a command. That is, the control element 201 interprets the command transmitted from the terminal 103 (the card reader/writer 102), and executes the processing corresponding to the command, or controls the return of a command execution result (a response) to the terminal 103. The data memory 202 is a nonvolatile data memory in which stored contents can be erased, is used to store types of data, and is constituted of, for example, an EEPROM. The working memory 203 is a memory to temporarily hold the data to be processed and data processed by the control element 201, and is constituted of, for example, an RAM. The program memory 204 is constituted of, for example, a mask ROM, and stores programs of the control element 201 and the like. The communicating unit 205 includes at least one of a terminal disposed on the surface of the card main body and an antenna buried in the card main body, and communicates with the card reader/writer 102 via the terminal or the antenna.

Figure 3:
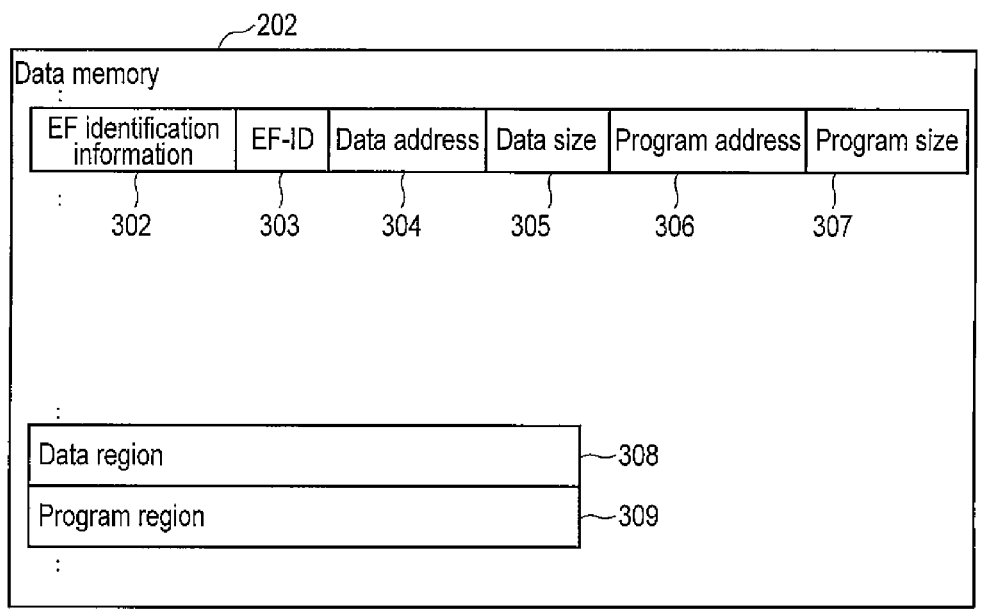
FIG. 3 is a diagram showing an example of a data structure of a data memory of the IC card according to the embodiment.

FIG. 3 is a diagram showing an example of a data structure of the data memory 202 of the IC card 101 according to the embodiment. Here, the data memory 202 includes a definition information region for storing definition information for use in controlling a file. For example, the file is a file for executing an application. The definition information includes elementary file (EF) identification information 302, EF-ID 303, a data address 304, a data size 305, a program address 306, and a program size 307.

Moreover, the data memory 202 includes a data region 308 where an EF data main body (the file) is stored. It is to be noted that in the present embodiment, the EF will be described as an example, but in place of the EF, a dedicated file (DF) may be stored. Furthermore, the data memory 202 includes a program region 309. The program region 309 stores a program code. This program code is a program code executed prior to executing command processing with reference to the EF.

The definition information region will be described. The EF identification information 302 is information for identifying the EF. The EF-ID 303 is EF identification information for use in referring to the EF from the outside. The data address 304 indicates a top address of the data region 308. The data size 305 is information indicating a size of the data region 308. The program address 306 indicates a top address of the program region 309. The program size 307 is information indicating a size of the program region 309. When the top address of the program region is not set, i.e., when the program address 306 indicates "FFFFFFFF", it is indicated that the program region 309 is not set. Moreover, when the program size 307 indicates "0000", it is indicated that the program is not set to the program region 309. In each of the above two cases, the processing is performed on the assumption that the program is not set to the program region 309.

Figure 4:
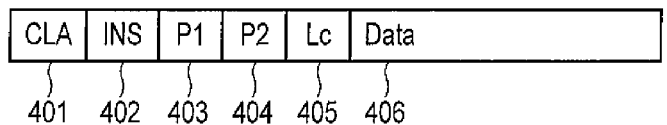
FIG. 4 shows an example of a format of a file creation command according to the embodiment.

FIG. 4 shows an example of a format of a file creation command according to the embodiment. As shown in FIG. 4, the file creation command includes a class byte (CLA) 401 of ISO/IEC 7816-4, an instruction byte (INS) 402 of ISO/IEC 7816-4, a parameter byte (P1) 403 of ISO/IEC 7816-4, a parameter byte (P2) 404 of ISO/IEC 7816-4, an Lc field (Lc) 405 of ISO/IEC 7816-4, and a command data field (Data) 406 of ISO/IEC 7816-4.

Figure 5:
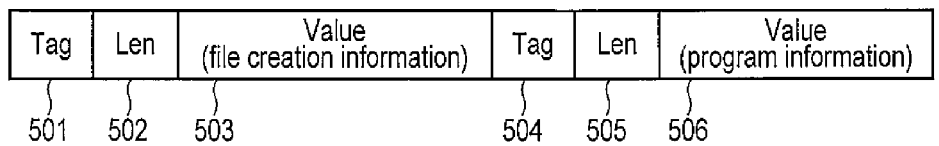
FIG. 5 is a diagram showing an example of data stored in a command data field (Data) according to the embodiment.

FIG. 5 is a diagram showing an example of data stored in the command data field (Data) 406 according to the embodiment. As shown in FIG. 5, for example, the command data field (Data) 406 includes file creation information 503 and program information 506. Description will be made in more detail. The command data field (Data) 406 includes Tag 501 for identifying the file creation information 503, information Len 502 indicating a length of the file creation information 503, and the file creation information 503, and further includes Tag 504 for identifying the program information 506, information Len 505 indicating a length of the program information 506, and the program information 506.

The file creation information 503 includes information to be stored in the definition information region, for example, the EF identification information 302, the EF-ID 303, the data address 304, the data size 305, the program address 306, the program size 307 and the like. The program information 506 includes a program code to be stored in the program region. The program information 506 does not include the program, but includes the set value sometimes.

FIG. 6 is a diagram showing an example of a format of a reading command according to the embodiment. As shown in FIG. 6, the reading command includes a class byte (CLA) 601 of ISO/IEC 7816-4, an instruction byte (INS) 602 of ISO/IEC 7816-4, a parameter byte (P1) 603 of ISO/IEC 7816-4, a parameter byte (P2) 604 of ISO/IEC 7816-4, and an Le field (Le) 605 of ISO/IEC 7816-4.

FIG. 7 is a diagram showing an example of each program code stored in the program memory 204 according to the embodiment. As shown in FIG. 7, the program memory 204 includes a program code 702 of the file creation command, and a program code (command execution information) 703 of the reading command.

FIG. 8 is a flowchart showing an example of the command processing of the file creation command according to the embodiment. The communicating unit 205 of the IC card 101 receives the file creation command from the terminal 103 (the card reader/writer 102), and the control element 201 starts the command processing of the file creation command (ST801).

For example, the control element 201 first executes parameter check processing (ST802). That is, the control element 201 checks whether or not values of P1 and P2 included in the file creation command are correct (ST802).

When the values of P1 and P2 are correct (ST802, YES), the control element 201 further executes data format check processing (ST803). That is, the control element 201 checks whether or not the Tag 501, the Len 502, the Tag 504 and the Len 505 shown in FIG. 5 are correct.

When the Tag 501, the Len 502, the Tag 504 and the Len 505 are correct (ST803, YES), the control element 201 further executes file creation information check processing (ST804). That is, the control element 201 checks validities of the EF identification information and EF-ID included in the file creation information 503.

When the control element 201 detects an abnormality in one of the parameter check processing, the data format check processing, and the file creation information check processing (ST802, NO) (ST803, NO) (ST804, NO), the control element executes an abnormal end response (ST809). For example, the control element 201 outputs an error of status bytes of ISO/IEC 7816-4 in accordance with the execution of the abnormal end response.

When the validities of the EF identification information and EF-ID included in the file creation information 503 are confirmed (ST804, YES), the control element 201 executes format conversion processing of the file creation information 503, to store the file creation information 503 in the definition information region (ST805). Furthermore, the control element 201 writes the file creation information 503 subjected to the format conversion processing (i.e. the definition information) in the definition information region (ST806). Furthermore, the control element 201 writes the program information 506 in the program region 309 (ST807). Then, the control element 201 executes normal end processing (ST808). For example, the control element outputs the status bytes of ISO/IEC 7816-4 in accordance with the execution of the normal end processing. As described above, the control element 201 ends the command processing of the file creation command (ST810).

Figure 9:
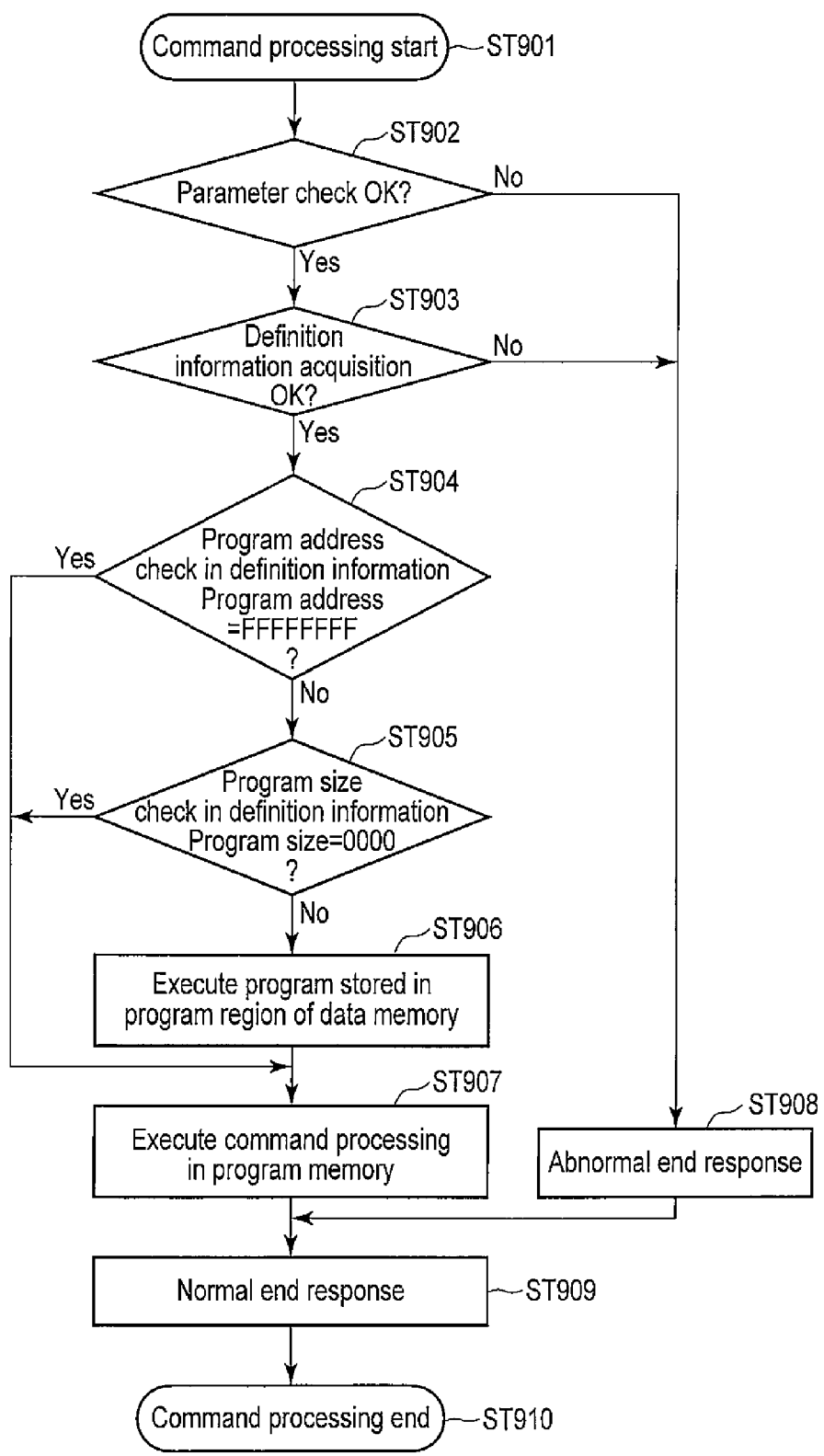
FIG. 9 is a flowchart showing an example of the command processing of the reading command according to the embodiment.

FIG. 9 is a flowchart showing an example of the command processing of the reading command according to the embodiment. The communicating unit 205 of the IC card 101 receives the reading command from the terminal 103 (the card reader/writer 102), and the control element 201 starts the command processing of the reading command (ST901).

For example, the control element 201 first executes parameter check processing (ST902). That is, the control element 201 checks whether or not the values of P1 and P2 included in the reading command are correct (ST902). When the values of P1 and P2 are correct (ST902, YES), the control element 201 further executes definition information acquisition processing (ST903). For example, the reading command includes EF-ID, and the control element 201 acquires the definition information stored in the data memory 202 on the basis of the EF-ID included in the reading command. That is, the control element 201 acquires the definition information including the same EF-ID as the EF-ID included in the reading command.

It is to be noted that when the control element 201 detects an abnormality in one of the parameter check processing and the definition information acquisition processing (ST902, NO) (ST903, NO), the control element executes an abnormal end response (ST908). For example, the control element 201 outputs an error of the status bytes of ISO/IEC 7816-4 in accordance with the execution of the abnormal end response.

When the abnormality is not detected (ST902, YES) (ST903, YES), the control element 201 checks the program address 306 in the definition information (ST904). When the program address 306 indicates "FFFFFFFF" (ST904, YES), the control element 201 judges that the program set to each EF is not present (unregistered), and executes the command processing on the basis of the reading command program code (the command execution information) 703 in the program memory 204 (ST907).

When the program address 306 indicates an address other than "FFFFFFFF" (ST904, NO), the control element 201 checks the program size 307 in the definition information (ST905). When the program size 307 indicates a size other than "0000" (ST905, NO), the control element 201 judges that the program is present (registered) in the program region 309, and executes the program stored in the program region 309 (ST906).

The control element 201 executes the command processing in the program memory 204 (ST907), after executing the program stored in the program region 309. Then, the control element 201 executes the normal end response. For example, the control element outputs the status bytes of ISO/IEC 7816-4 in accordance with the execution of the abnormal end processing. As described above the control element 201 ends the command processing of the reading command (ST910).

Figure 10:
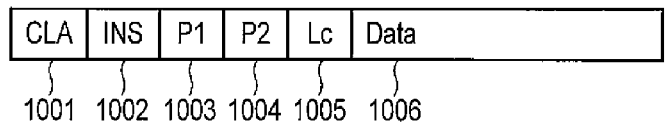
FIG. 10 is a diagram showing an example of a correction command to change or delete the program code or a set value according to the embodiment.

FIG. 10 is a diagram showing an example of a correction command (a change command) to change or delete the program code or the set value according to the embodiment. As shown in FIG. 10, the correction command includes a class byte (CLA) 1001 of ISO/IEC 7816-4, an instruction byte (INS) 1002 of ISO/IEC 7816-4, a parameter byte (P1) 1003 of ISO/IEC 7816-4, a parameter byte (P2) 1004 of ISO/IEC 7816-4, an Lc field (Lc) 1005 of ISO/IEC 7816-4, and a command data field (Data) 1006 of ISO/IEC 7816-4.

Figure 11:
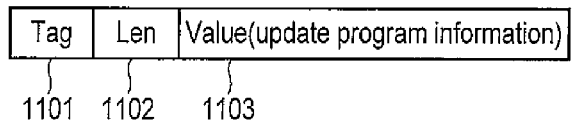
FIG. 11 is a diagram showing an example of data stored in the command data field (Data) of the correction command according to the embodiment.

FIG. 11 is a diagram showing an example of data stored in the command data field (Data) 1006 of the correction command according to the embodiment. As shown in FIG. 11, the command data field (Data) 1006 includes Tag 1101 for identifying update program information 1103, information Len 1102 indicating a length of the update program information 1103, and the update program information 1103. The update program information 1103 further includes a program code (the program code for update) stored in the program region 309. The update program information 1103 does not include the program code, but includes the set value (the set value for update) sometimes.

When the communicating unit 205 of the IC card 101 receives the above correction command, the control element 201 interprets the correction command, writes, in the program region 309, the program code (the program code for update) included in the update program information 1103 included in the correction command, and updates (changes) the program code of the program region 309. In consequence, the IC card 101 can update the program code of the program region 309, and can execute the updated program code.

Moreover, when the correction command does not include the Lc field (Lc) 1005 of ISO/IEC 7816-4 and the command data field (Data) 1006 of ISO/IEC 7816-4, the control element deletes the program code or the set value stored in the program region 309 in accordance with the correction command.

When the communicating unit 205 of the IC card 101 receives the above correction command, the control element 201 interprets the correction command. When the correction command does not include the Lc field (Lc) 1005 of ISO/IEC 7816-4 and the command data field (Data) 1006 of ISO/IEC 7816-4, the control element 201 deletes the program code or the set value of the program region 309. In consequence, the IC card 101 can delete the program code or the set value of the program region 309. That is, the IC card 101 can omit processing on the basis of the program code which becomes unnecessary.

Figure 12:
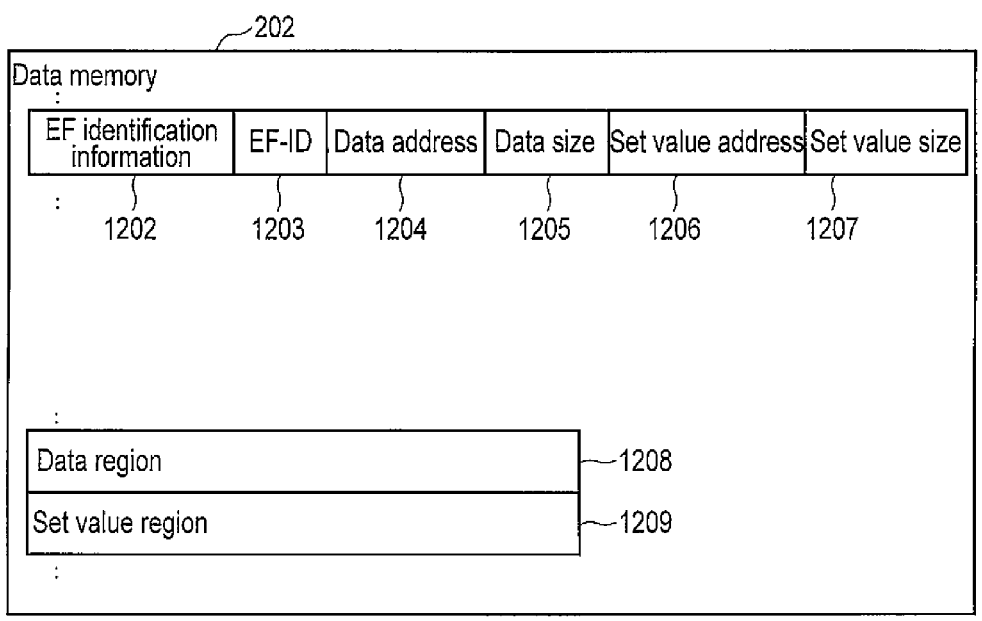
FIG. 12 is a diagram showing an example of the data structure of the data memory according to the embodiment.

FIG. 12 is a diagram showing an example of the data structure of the data memory 202 according to the embodiment. As shown in FIG. 12, the data memory 202 includes a definition information region for use in controlling a file. The definition information region includes elementary file (EF) identification information 1202, EF-ID 1203, a data address 1204, a data size 1205, a set value address 1206, and a set value size 1207.

Moreover, the data memory 202 includes a data region 1208 where an EF data main body is stored. It is to be noted that in the present embodiment, the EF will be described as an example, but in place of the EF, a dedicated file (DF) may be stored. Furthermore, the data memory 202 includes a set value region 1209. The set value region 1209 stores a program code. This program code is a program code executed prior to executing command processing with reference to the EF.

The definition information region will be described. The EF identification information 1202 is information for identifying the EF. The EF-ID 1203 is EF identification information for use in referring to the EF from the outside. The data address 1204 indicates a top address of the data region 1208. The data size 1205 is information indicating a size of the data region 1208. The set value address 1206 indicates a top address of the set value region 1209. The set value size 1207 is information indicating a size of the set value region 1209. When the top address of the set value region is not set, i.e., when the set value address 1206 indicates "FFFFFFFF", it is indicated that the set value region 1209 is not set. Moreover, when the set value size 1207 indicates "0000", it is indicated that the set value is not set to the set value region 1209. In each of the above two cases, the processing is performed on the assumption that the set value is not set to the set value region 1209.

FIG. 13 is a flowchart showing an example of the command processing of the reading command according to the embodiment. The communicating unit 205 of the IC card 101 receives the reading command from the terminal 103 (the card reader/writer 102), and the control element 201 starts the command processing of the reading command (ST1301).

For example, the control element 201 first executes parameter check processing (ST1302). That is, the control element 201 checks whether or not the values of P1 and P2 included in the reading command are correct (ST1302). When the values of P1 and P2 are correct (ST1302, YES), the control element 201 further executes definition information acquisition processing (ST1303).

It is to be noted that when the control element 201 detects an abnormality in one of the parameter check processing and the definition information acquisition processing (ST1302, NO) (ST1303, NO), the control element executes an abnormal end response (ST1308). For example, the control element 201 outputs an error of the status bytes of ISO/IEC 7816-4 in accordance with the execution of the abnormal end response.

When the abnormality is not detected (ST1302, YES) (ST1303, YES), the control element 201 checks the set value address 1206 in the definition information (ST1304). When the set value address 1206 indicates "FFFFFFFF" (ST1304, YES), the control element 201 judges that the set value set to each EF is not present, and executes the command processing on the basis of the reading command program code (the command execution information) 703 in the program memory 204 (ST1307).

When the set value address 1206 indicates an address other than "FFFFFFFF" (ST1304, NO), the control element 201 checks the set value size 1207 in the definition information (ST1305). When the set value size 1207 indicates a size other than "0000" (ST1305, NO), the control element 201 judges that the set value is present in the set value region 1209, and executes command processing in the program memory 204 with reference to the set value stored in the set value region 1209 (ST1306).

The control element 201 executes the command processing in the program memory 204 (ST1307), after executing the command processing with reference to the set value stored in the set value region 1209. Then, the control element 201 executes the normal end response. For example, the control element outputs the status bytes of ISO/IEC 7816-4 in accordance with the execution of the normal end processing. As described above, the control element 201 ends the command processing of the reading command (ST1310).

Hereinafter, the present embodiment described above will be summarized.

The IC card 101 which interprets and executes the instructions from the outside and returns the results associates and registers part of the command processing to operate the applications or the files in the IC card 101, every application or file. While the above command is executed, the IC card calls part of the registered command processing, to execute the processing.

Furthermore, the IC card 101 executes the predetermined processing (the command processing), when part of the command processing is unregistered.

Moreover, in the IC card 101, part of the command processing to operate these applications or files in the IC card 101 is not constituted of a procedure, but is constituted of a reference numeric value, every application or file. While the above command is executed, part of the command processing is called and executed with reference to the above reference numeric value.

Furthermore, the IC card 101 can register, change or delete part of the command processing which can be associated and registered or an object of the reference constituted of the numeric value, in accordance with a command for exclusive use.

As described above, the IC card 101 can, in the command processing, add or change the command processing even in accordance with the same command every application or file. That is, the command processing can be added and changed by the unit of the EF. Therefore, different command processing can easily be mounted every EF. In consequence, it is not necessary to beforehand completely prepare even the unnecessary processing, and the minimum number of pieces of the command processing can be mounted. It is not necessary to completely prepare all optional functions. Therefore, when, for example, wrong designation is performed, the processing can be interrupted. Furthermore, in a specific application, processing for the unnecessary option selection is not required, and hence the processing can efficiency be executed.

Moreover, according to a manufacturing method of the IC card, an IC card manufacturing apparatus manufactures the IC card 101 described above. For example, the IC card manufacturing apparatus manufactures the IC module 200, and further manufactures the IC card 101 by using the card main body (the base material) 101a of the plastic or the like and the IC module 200.

Furthermore, according to an IC card issuing method, an IC card issuing apparatus (the IC card issuing apparatus constituted of the card reader/writer 102, the terminal 103, the keyboard 104, the display 105, the printer 106, etc.) issues the IC card 101 described above. For example, the IC card issuing apparatus (the card reader/writer 102) writes issuance information in the data memory 202 of the IC card 101 manufactured by the above IC card manufacturing apparatus, and issues the IC card 101. The issuance information is, for example, personal information, and the information is stored in the card reader/writer 102 or the like.

According to at least one of the above embodiments, there can be provided an IC card and a command execution method in which flexible command processing can be executed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication medium comprising:
    a storage unit configured to store files, definition information to control the files, a program designated by the definition information and settable for each of the files, and command execution information to execute command processing corresponding to a command;
    a receiving unit configured to receive the command; and
    an executing unit configured to interpret the command, and start the command processing,
    wherein in response to the start of the command processing, the executing unit executes the command processing based on the command execution information when the executing unit determines that the program does not exist based on the definition information settable for each of the files, and executes the program based on the definition information and executes the command processing based on the command execution information after the execution of the program when the executing unit determines that the program exists based on the definition information settable for each of the files.

2. The communication medium of claim 1, wherein
the receiving unit receives a file creation command, and
the executing unit interprets the file creation command, and writes the definition information and the program in the storage unit.

3. The communication medium of claim 1, wherein
the receiving unit receives a change command, and
the executing unit interprets the change command, and changes the program stored in the storage unit on the basis of a change program included in the change command.

4. The communication medium of claim 1, wherein
the storage unit includes a rewritable nonvolatile data memory, and a non-rewritable program memory,
the data memory stores the definition information and the program, and
the program memory stores the command execution information.

5. The communication medium of claim 1, wherein
each of the files is associated with an application.

6. A command execution method which is applicable to a communication medium configured to store files, definition information to control the files, a program designated by the definition information and settable for each of the files, and command execution information to execute command processing corresponding to a command, the method comprising:
receiving the command;
interpreting the command, and starting the command processing; and
in response to the start of the command processing, executing the command processing based on the command execution information when it is determined that the program does not exist based on the definition information settable for each of the files, and executing the program based on the definition information and executing the command processing based on the command execution information after the execution of the program when it is determined that the program exists based on the definition information settable for each of the files.

7. The command execution method of claim 6, wherein
each of the files is associated with an application.

8. An IC card including a card main body in which an IC module is embedded, the IC module comprising:
a storage unit configured to store files, definition information to control the files, a program designated by the definition information and settable for each of the files, and command execution information to execute command processing corresponding to a command;
a receiving unit configured to receive the command; and
an executing unit configured to interpret the command and start the command processing,
wherein in response to the start of the command processing, the executing unit executes the command processing based on the command execution information when the executing unit determines that the program does not exist based on the definition information settable for each of the files, and executes the program based on the definition information and executes the command processing based on the command execution information after the execution of the program when the executing unit determines that the program exists based on the definition information settable for each of the files.

9. The IC card of claim 8, wherein
each of the files is associated with an application.

* * * * *